(12) United States Patent
Kar et al.

(10) Patent No.: US 8,894,729 B2
(45) Date of Patent: Nov. 25, 2014

(54) GASIFICATION REACTOR

(75) Inventors: Ibrahim Kar, Köln (DE); Manfred Heinrich Schmitz-Goeb, Gummersbach (DE)

(73) Assignee: shell Oil Company, Houston, TX (US)

( * ) Notice: Subject to any disclaimer, the term of this patent is extended or adjusted under 35 U.S.C. 154(b) by 0 days.

(21) Appl. No.: 13/979,748

(22) PCT Filed: Jan. 12, 2012

(86) PCT No.: PCT/EP2012/050408
§ 371 (c)(1),
(2), (4) Date: Sep. 20, 2013

(87) PCT Pub. No.: WO2012/095475
PCT Pub. Date: Jul. 19, 2012

(65) Prior Publication Data
US 2014/0001406 A1  Jan. 2, 2014

(30) Foreign Application Priority Data
Jan. 14, 2011  (EP) ..................................... 11150933

(51) Int. Cl.
*C10J 3/68* (2006.01)

(52) U.S. Cl.
USPC ...... 48/76; 48/61; 48/69; 48/127.1; 48/127.9; 48/71; 48/72; 48/73; 48/200; 48/201; 48/202

(58) Field of Classification Search
USPC ............... 48/61, 127.9, 127.1, 76, 69, 71–73, 48/200–202
See application file for complete search history.

(56) References Cited

U.S. PATENT DOCUMENTS

| | | | |
|---|---|---|---|
| 963,353 | A | 7/1910 | Blake |
| 4,400,097 | A | 8/1983 | Koschnitzke et al. |
| 4,936,376 | A | 6/1990 | Martin et al. |
| 5,064,168 | A | 11/1991 | Raines et al. |
| 5,230,717 | A * | 7/1993 | Ogawa et al. ..................... 48/76 |
| 5,372,618 | A | 12/1994 | Andrus, Jr. |
| 7,328,609 | B1 | 2/2008 | Hopper et al. |
| 7,703,472 | B2 * | 4/2010 | Carolan et al. ................... 137/71 |
| 8,006,983 | B2 * | 8/2011 | Russell et al. ................. 277/314 |
| 8,136,544 | B2 * | 3/2012 | Wilson et al. ................. 137/240 |
| 2007/0119577 | A1 * | 5/2007 | Kraft et al. ..................... 165/157 |
| 2008/0042373 | A1 | 2/2008 | Wilson et al. |
| 2009/0029229 | A1 * | 1/2009 | Kanno ............................ 429/34 |
| 2009/0119993 | A1 * | 5/2009 | Neves et al. ................. 48/197 R |
| 2011/0023362 | A1 * | 2/2011 | Kirchhubel et al. .............. 48/71 |

FOREIGN PATENT DOCUMENTS

| | | |
|---|---|---|
| CN | 2880849 | 3/2007 |
| FR | 1561604 | 3/1969 |
| GB | 1501284 | 2/1978 |
| JP | 8134472 | 5/1996 |
| JP | 2003106960 | 4/2003 |
| WO | 2009020809 A1 | 2/2009 |

* cited by examiner

Primary Examiner — Kaity Handal

(57) ABSTRACT

A gasification reactor comprising a gasifier with a tubular gastight wall arranged within a pressure vessel. The gasification reactor comprises one or more pressure responsive devices comprising a sleeve with a cooled section extending outwardly from an opening in the gastight wall. The pressure responsive devices can, e.g., include a pressure measurement device and/or a pressure equalizer. Method of using a pressure responsive device with such a gasifier, wherein a heat sluice is used formed by a sleeve with a cooled section extending outwardly from an opening in the gastight wall.

12 Claims, 3 Drawing Sheets

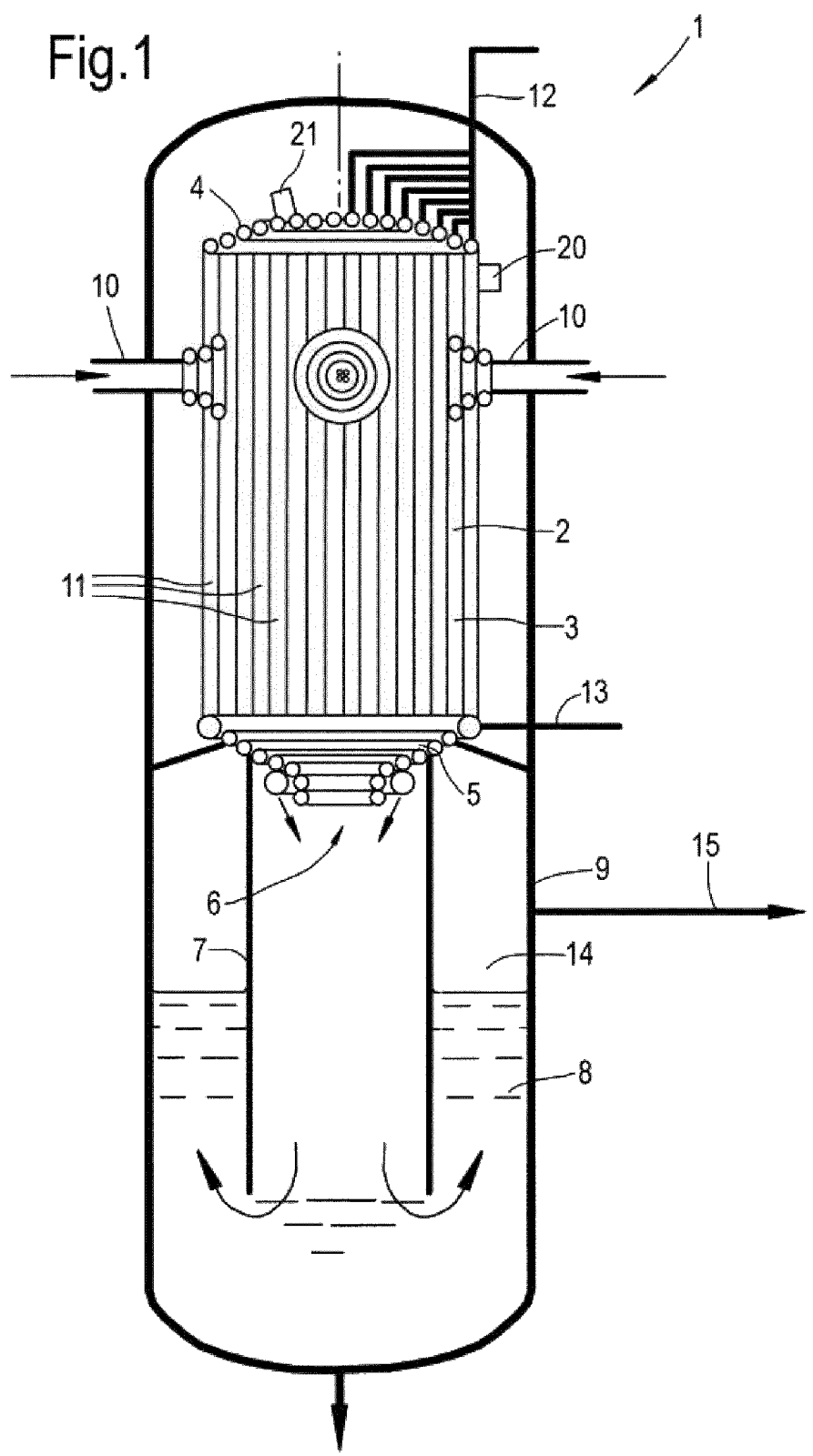

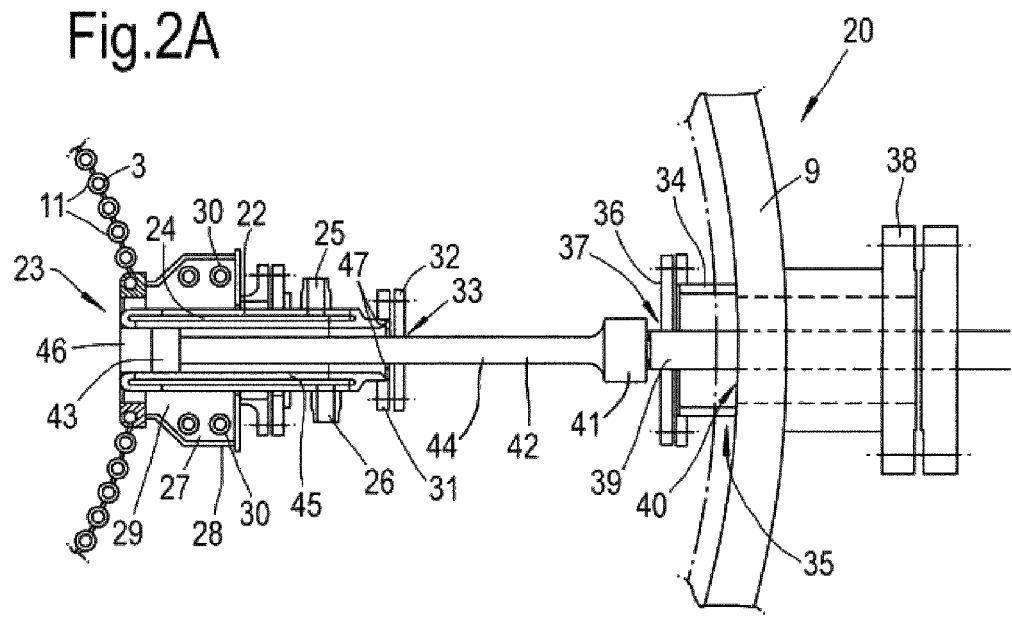
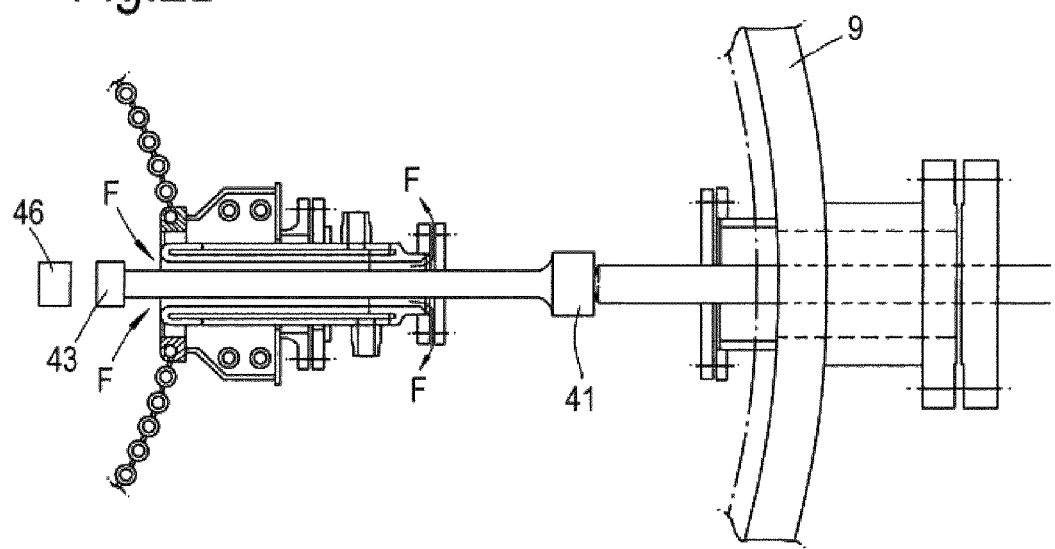

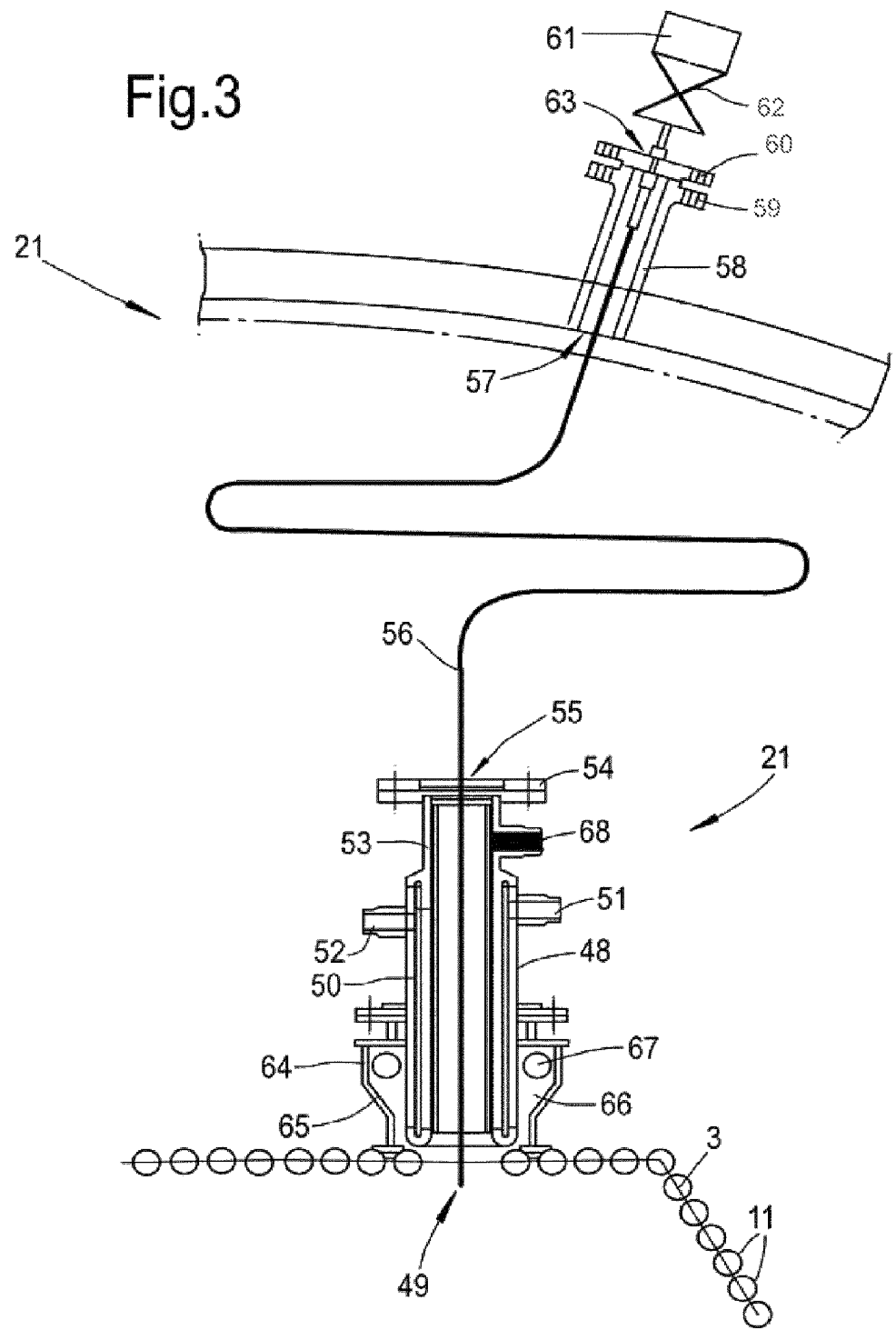

GASIFICATION REACTOR

PRIORITY CLAIM

The present application claims priority from PCT/EP2012/050408, filed 12 Jan. 2012, which claims priority from European application 11150933.7, filed 14 Jan. 2011, which is incorporated herein by reference.

BACKGROUND OF THE INVENTION

The present invention relates to a gasification reactor comprising a gasifier in a tubular gastight wall with a lower end opening into an aqueous slag collection bath, wherein the gastight wall is arranged within a pressure vessel. The invention also relates to a method of using a pressure responsive device, such as pressure equalizer or a pressure measurement device, with such a gasification reactor. The invention also relates to a pressure equalizer and a pressure measurement device for such a gasification reactor.

Gasification reactors can for instance be used for the production of synthetic gas by partial combustion of a carbonaceous feed, such as pulverized coal, oil, biomass, gas or any other type of carbonaceous feed. During this process, slag is continuously deposited on the inside of the gastight wall of the gasifier. Slag deposits fall down from the gasifier wall into the slag collection bath.

Some gasification reactor types only have a discharge opening at their lower end for discharging syngas via the aqueous slag collection bath. Due to the pressure build-up in the gasifier, freshly produced synthetic gas containing slag and fly ash particles is forced to flow down through the slag collection bath around the lower edge of the gasifier wall to be recollected in the annular space between the gasifier wall and the pressure vessel wall. This way the water in the slag collection bath cleans and cools the synthetic gas.

The amount and size of the slag lumps falling from the gasifier wall can be such that the discharge opening of the gasifier is continuously covered by slag lumps reducing—or even blocking—the effective gasifier outlet opening. This causes a built up of overpressure in the gasifier which can cause substantial damage.

The temperature in the gasifier can be as high as about 1600° C. Due to these high temperatures and the high pressure and circulation of fly ash and slag particles, pressure control could only take place by using downstream pressure control equipment. It was hitherto not possible to monitor or control pressure built up within the gasifier itself or to reduce pressure differences between the spaces at either side of the gasifier wall.

SUMMARY OF THE INVENTION

It is an object of the invention to enable direct monitoring and/or equalization of overpressure within the gasifier.

The object of the invention is achieved with a gasification reactor comprising a gasifier with a tubular gastight wall arranged within a pressure vessel, wherein the gasification reactor comprises one or more pressure responsive devices comprising a sleeve with a cooled section extending outwardly from an opening in the gastight wall.

With a reactor according to the invention, the cooled sleeve forms a heat sluice and creates an area with the same pressure as within the gasifier, but with substantially lower temperatures. This makes it possible to provide means for measuring or equalizing pressure.

To protect the gasifier wall against the high temperatures within the gasifier, the wall is generally cooled. To this end the gastight wall can for instance wholly or partly be built from interconnected parallel tubular coolant lines. In that case these tubular lines can be by-passed around the one or more openings. Alternatively, if the tubular lines are interconnected by fins, the openings can be created by local interruption of the fins.

The sleeve can be used in a pressure equalizer by providing a ram which is slideable within the cooled sleeve between a first position closing off the sleeve, and a second position wherein the sleeve is at least partly open to form a passage from one side of the gastight gasifier wall to the other side. Such a ram can for instance be actuated by an actuator, e.g., a hydraulic actuator. Such an actuator can for example have the usual configuration of a rapper device used for removing fouling and scaling. The ram can for instance comprise a ram head directed to the opening in the gasifier wall with a diameter forming a slideable tight fit within the sleeve, the ram having a body connected to the ram head, the body having a smaller diameter than the ram head, wherein the sleeve comprises an outlet which is open at least when the ram is in the second position and wherein the ram head is within the sleeve when the ram is in its first position while the ram head projects out of the sleeve into the gasifier when the ram is in its second position. Optionally, the other end of the ram can be provided with a second ram head forming a slideable tight fit within the sleeve. Optionally, the opening in the tubular wall is sealed with a ceramic disk when the ram is in the first position. In case of overpressure in the gasifier, the actuator can be activated to move the ram towards the second position pushing the first ram head out of the opening in the gasifier wall. If a ceramic disk is present, it is pushed away. Gas can now freely flow from the gasifier through the opening in the tubular gasifier wall and the space between the ram body and the inner sleeve surface to the gas outlet of the sleeve. This will equalize the pressure difference between the interior of the gasifier and the space between the gasifier and the pressure vessel.

To monitor pressure build-up, the cooled sleeve can be used in connection with a pressure measurement device, e.g., by providing a connection between the space enclosed by the sleeve of at least one of the one or more openings and a pressure sensor. The pressure sensor can for example be located at the exterior of the pressure vessel if a pressure line connects the sleeve to the pressure sensor. Optionally, such a pressure line can be provided with a valve positioned between the pressure sensor and the exterior of the pressure vessel.

A second pressure sensor can be used to measure the pressure in the annular space between the pressure vessel wall and the gastight gasifier wall. This makes it possible to determine a differential pressure.

Optionally, the sleeve can be provided with a refractory lining surrounding the sleeve's end around the opening. In that case, one or more sections of the tubular lines by-passing one of the openings can be embedded in the refractory lining around the sleeve section.

In order to be able to keep the space enclosed by the sleeve clean and open, the sleeve can for example be connected to a source of purging gas, e.g., by means of one or more nozzles directed towards the opening surrounded by the sleeve. The purging gas can be any inert gas, such as nitrogen, steam or clean product gas.

As used herein, pressure responsive device can refer to a pressure equalizing device, a pressure measurement device or differential pressure measurement device, a combination of one or more (differential) pressure measurement devices with one or more pressure equalizing devices or any other type of pressure responsive device.

An exemplary embodiment of the invention will now be described by reference to the accompanying drawing, in which:

BRIEF DESCRIPTION OF THE DRAWINGS

FIG. 1: shows schematically a longitudinal cross section of an embodiment of a gasification reactor according to the present invention;

FIG. 2A: shows in cross section an embodiment of a pressure equalizer according to the invention in closed position;

FIG. 2B: shows the pressure equalizer of FIG. 2A in opened position;

FIG. 3: shows in cross section an embodiment of a pressure measurement device according to the invention.

DESCRIPTION OF THE PREFERRED EMBODIMENT

FIG. 1 shows a schematic cross section of an exemplary embodiment of a gasification reactor 1 according to the present invention. The gasification reactor 1 comprises a gasifier 2 in a tubular gastight wall 3 with a closed top end 4 and a conical lower section 5 narrowing down to a open lower end 6 which opens into a coaxially arranged cylindrical duct 7. The duct 7 opens into a slag collection bath 8 filled with water.

The gasifier 2 is arranged coaxially within a closed cylindrical pressure vessel 9. Burners 10 extend from outside through the wall of the pressure vessel 9 and the tubular wall 3 into the gasifier 2 to partially combust pulverized coal or another type of carbonaceous feed.

The tubular wall 3, its closed top end 4 and its conical lower end 5 are built from a plurality of parallel tubular lines 11. The lines 11 are operatively connected to a coolant supply 13 and lead to a coolant discharge 12.

During operation, the gasifier content is heated to a temperature of 1200-1600° C. At these temperatures the carbonaceous feed is partially combusted to form synthetic gas loaded with slag and fly ash. Due to the pressure built-up in the gasifier 2 the gasifier content is forced to flow downwardly via the opening 6 and the duct 7 into the water of the slag collection bath 8. The water of the slag collection bath 8 filters the syngas to remove fly ash and slag. The filtered syngas surfaces in the annular space 14 between the duct 7 and the pressure vessel 9, where the pressure is substantially lower than in the gasifier 2 and the duct 7. Here, the syngas is discharged via a discharge line 15.

The gastight wall 3 of the gasifier 2 comprises one or more pressure responsive devices 20, 21 extending from the exterior of the tubular wall 3. The pressure responsive devices can include pressure equalizing devices 20 and/or pressure measurement devices 21. The one or more pressure equalizing devices 20 can for instance be located near the top of the tubular wall 3, where the risk of slag coverage is lowest. The pressure measurement devices 21 can for instance be positioned on the top end 4 of the gasifier 2. A plurality of measurement devices 21 can be used, e.g., a number of three pressure measurement devices. The pressure responsive devices 20, 21 are shown in more detail in FIGS. 2 and 3 respectively.

FIGS. 2A and 2B show in cross section a pressure responsive device 20 forming a pressure equalizer for preventing overpressure in the gasifier 2 and for equalizing the pressure in the gasifier 2 and the pressure between the pressure vessel wall 9 and the tubular wall assembly 3. The pressure equalizer 20 comprises a hollow cylindrical double-walled sleeve 22 extending outwardly from the tubular wall 3. The sleeve 22 is connected to an opening 23 in the tubular wall assembly 3. The sleeve 22 is double-walled to define an annular cylindrical coolant channel 24 between its double walls. The annular coolant channel 24 comprises a coolant inlet 25 and a coolant outlet 26, operatively connected to a coolant supply and a coolant discharge, respectively (not shown). The coolant is usually water.

At the opening 23 the sleeve 22 is surrounded by a refractory box 27 comprising a metal casing 28 filled with a refractory material 29. The refractory material 29 embeds by-pass sections 30 for by-passing the lines 11 of the tubular wall section 3 around the opening 23.

At its end opposite to the opening 23 the double walled sleeve 22 is provided with a flange 31 connected to a cover 32 with a central opening 33.

A flanged bus 34 surrounds an opening 35 in the wall of the pressure vessel 9. The flanged bus 34 is connected to a cover 36 with a central opening 37. A hydraulic actuator 38 on the exterior of the pressure vessel 9 comprises a piston 39 extending from the outside of the pressure vessel 9 through an opening 40 in the pressure vessel 9 and through the central opening 37 in the cover 36. The piston 39 abuts a ram head 41 of a ram 42 extending into the sleeve 22 via the opening 33 in the cover 32 heading the sleeve 22.

The ram 42 extends to a point near the opening 23 in the tubular wall 3, where it has a second ram head 43 and an intermediate section 44 extending between the ram heads 41, 43. The intermediate section 44 has a smaller diameter than the ram heads 41, 43. This creates an annular space 45 between the intermediate section 42 and inner surface of the double walled sleeve 22. The ram heads 41, 43 are slideable within the hollow sleeve 22 with little clearance. The opening 23 in the tubular wall 3 is sealed with a ceramic sealing disk 46 protecting the second ram head 43 and the sleeve 22 against the heat within the gasifier 2. The second ram head 43 abuts the ceramic disk 46. The first ram head 41 abuts the piston 37. Outlet channels 47 between the cover 32 and the flange 31 connect the inner space 45 with the space between the tubular wall 3 and the pressure vessel wall 9.

FIG. 2A shows the pressure equalizer 20 in a closed position, when the ceramic disk 46 seals the opening 23 and the second ram head 43 is within the hollow sleeve 22. If an overpressure is detected within the gasifier 2 the hydraulic actuator 38 is activated to move the piston 39 to impact the ram 42, which in turn impacts the ceramic sealing disk 46. The ceramic disk 46 and the second ram head 43 are pushed out of the opening 23 in the tubular wall 3. This open position of the pressure equalizer 20 is shown in FIG. 2B.

Pressurized reactor gas can now freely flow through the space 45 between the intermediate section 44 of the ram 42 and the inner side of the hollow sleeve 22 towards the outlets 47 where the gas enters the annular space between the wall 3 of the gasifier 2 and the pressure vessel 9. After a while, the pressure in the annular space between the gasifier 2 and the wall of the pressure vessel 9 will equalize with the pressure within the gasifier 2.

FIG. 3 shows pressure measurement device 21. Similar as with the embodiment of FIG. 2, the measurement device 21 comprises a hollow cylindrical sleeve 48 extending outwardly from the tubular wall 3. The sleeve 48 is connected to an opening 49 in the tubular wall assembly 3. The lines 11 are interconnected by fins (not shown).

At its end connected to the tubular wall 3, the sleeve 48 comprises a double-walled cylinder section 50 defining an annular cylindrical coolant channel between its double walls with a coolant inlet 51 and a coolant outlet 52. At the opposite end the sleeve 48 comprises a single-walled cylinder section 53 in line with the double-walled section 50. The outer end of the single walled section 53 is closed off with a lid 54 with an opening 55 for the passage of a pressure line 56. The pressure line 56 leads to an opening 57 in the wall of the pressure vessel 9. A bus 58 fitting in the opening 57 extends outwardly from the pressure vessel 9. The bus 58 has a flanged end 59 for a flange connection with a lid 60 carrying a pressure sensor 61 which is operatively in contact with the content of the pressure line 56 via a close-off valve 62 and an opening 63 in the lid 60.

At the opening 49 in the tubular wall 3 the sleeve 48 is surrounded by a refractory box 64 comprising a metal casing 65 filled with a refractory material 66 embedding by-pass sections 67 of the lines 11 of the tubular wall 3.

At the single walled section 53, the sleeve 48 comprises an inlet 68 for connection to a source of a purging gas (not shown). To prevent blocking of the opening 49 by slag deposits, purging gas can be used to blast away the slag deposits. The purging gas can for instance be nitrogen.

Gasifier gas freely passes the opening 49 into the sleeve 48 and the pressure line 56. The gas is cooled in the double walled section 50 of the sleeve 48, which serves as a heat sluice. As a result, the gas near the pressure sensor has the same pressure as the gas content in the gasifier 2, but has a lower temperature which is sufficiently low for a proper functioning of the pressure sensor 61. The pressure sensor 61 is easily accessible at the exterior of the pressure vessel 9 and may be provided with a display.

Optionally, a second pressure sensor is integrated in the system to measure the pressure in the annular space between the tubular wall 3 and the wall of the pressure vessel 9. This way, the differential pressure between the gasifier and the annular space between the gasifier 2 and the wall of the pressure vessel 9 can be determined.

Optionally, more than one pressure measurement devices 21, e.g., three or more, can be used to measure the pressure in the gasifier on different spots.

What is claimed is:

1. A gasification reactor comprising a gasifier with a tubular gastight wall arranged within a pressure vessel, wherein the gasification reactor comprises one or more pressure responsive devices comprising a sleeve with a cooled section extending outwardly from an opening in the gastight wall; and wherein a ram is slideable within the sleeve between a first position closing off the sleeve, and a second position wherein the sleeve is at least partly open to form a passage from one side of the gastight gasifier wall to the other side.

2. A gasification reactor according to claim 1 wherein the cooled section of the sleeve is provided with a double wall enclosing an annular coolant channel.

3. A gasification reactor according to claim 1 wherein the gastight wall is at least partly built from interconnected parallel tubular lines, and wherein the tubular lines are by-passed around the at least one of the one or more openings at the exterior side of the gasifier.

4. A gasification reactor according to claim 1 wherein the ram is within the operative scope of an actuator.

5. A gasification reactor according to claim 1 wherein the space enclosed by the sleeve of at least one of the one or more openings is operatively connected to a pressure sensor.

6. A gasification reactor according to claim 5 wherein the pressure sensor is located at the exterior of the pressure vessel and wherein a pressure line connects the sleeve to the pressure sensor.

7. A gasification reactor according to claim 6 wherein a second pressure sensor measures the pressure between the pressure vessel and the gastight gasifier wall to determine a differential pressure.

8. A gasification reactor according to claim 1 wherein the gasifier wall is at least partly built from parallel tubular coolant lines interconnected by fins in a gastight manner and wherein at least one of the one or more openings is formed by one or more local interruptions in one or more of the fins.

9. A gasification reactor according to claim 1 wherein a refractory lining surrounds the cooled section of the sleeve around the opening.

10. A gasification reactor according to claim 9 wherein one or more sections of the tubular lines by-passing one of the openings are embedded in the refractory lining around the sleeve section.

11. A gasification reactor according to claim 1 wherein the sleeve comprises a purging gas inlet.

12. A method of using a pressure responsive device with a gasifier having a gastight wall arranged within a pressure vessel wherein a heat sluice is used formed by a sleeve with a cooled section extending outwardly from an opening in the gastight wall; and wherein a ram is slideable within the sleeve between a first position closing off the sleeve, and a second position wherein the sleeve is at least partly open to form a passage from one side of the gastight gasifier wall to the other side.

* * * * *